United States Patent
Tobishima et al.

(10) Patent No.: US 6,984,007 B2
(45) Date of Patent: Jan. 10, 2006

(54) ELECTRONIC EQUIPMENT

(75) Inventors: Yasuyuki Tobishima, Saitama (JP); Nobumitsu Kasahara, Saitama (JP); Akira Shimizu, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/118,899

(22) Filed: Apr. 10, 2002

(65) Prior Publication Data

US 2002/0153810 A1 Oct. 24, 2002

(30) Foreign Application Priority Data

Apr. 19, 2001 (JP) ............... P.2001-121791

(51) Int. Cl.
*A47B 5/00* (2006.01)

(52) U.S. Cl. ....................... 312/7.2

(58) Field of Classification Search ............ 312/7.2, 312/223.1, 330.1; 348/837; 248/917, 919, 248/920
See application file for complete search history.

(56) References Cited

U.S. PATENT DOCUMENTS

| | | | |
|---|---|---|---|
| 5,161,028 A * | 11/1992 | Kawata et al. ............. 348/837 |
| 5,204,666 A | 4/1993 | Aoki et al. |
| 5,467,106 A * | 11/1995 | Salomon ..................... 345/87 |
| 5,847,685 A * | 12/1998 | Otsuki ........................ 345/87 |
| 5,966,360 A * | 10/1999 | Miyazaki et al. ............ 369/71 |
| RE37,157 E * | 5/2001 | Ikeda et al. ................ 399/124 |
| 6,490,238 B1 * | 12/2002 | Begley et al. ............ 369/75.2 |
| 2002/0044765 A1 * | 4/2002 | Elberbaum ................... 386/94 |
| 2002/0126441 A1 * | 9/2002 | Kuo et al. .................. 361/680 |

FOREIGN PATENT DOCUMENTS

JP 5-170031 A 7/1993
JP P2001334844 A 12/2001

* cited by examiner

*Primary Examiner*—Robert P. Olszewski
*Assistant Examiner*—A. Joseph Wujciak
(74) *Attorney, Agent, or Firm*—Sughrue Mion, PLLC

(57) ABSTRACT

In an electronic equipment, cushion members 11 are provided in a casing 10. Cleaning members 12 are provided in a subcasing 31 that is capable of performing relative movement with respect to the casing 10. In a process of movement of the subcasing 31, the cleaning members 12 abut against surfaces of the cushion members 11 and remove foreign materials adhered thereon.

26 Claims, 4 Drawing Sheets

ELECTRONIC EQUIPMENT

BACKGROUND OF THE INVENTION

1. Field of the Invention

The present invention generally relates to electronic equipment installed on mobile bodies, such as a vehicle and an airplane, and typified by a display, and more particularly to electronic equipment comprising a stationary unit and a movable unit.

2. Description of the Related Art

In recent years, compact and lightweight displays have been mounted on mobile bodies, such as a vehicle and an airplane. This enables drivers and passengers to be supplied with image information even in mobile bodies.

Especially, regarding small on-vehicle displays, there have been developed a display of the type that can be accommodated in a dashboard, in addition to a display of the type fixed on the top surface of a dashboard of a vehicle.

Applicant of the present application filed Japanese Patent Application No. 3-355768 disclosing an invention, which relates to a vehicle-mounted display that can be accommodated in a dashboard. Hereinafter, the related art of the invention is described in detail.

FIGS. 4 and 5 show a vehicle-mounted display just as described in the specification and drawings attached to the request in Japanese Patent Application No. 3-355768. FIG. 4 illustrates a state in which the vehicle-mounted display is attached to a dashboard D. Further, FIG. 5 is a side view illustrating the main unit of the vehicle-mounted display, which is taken from the right side thereof. The top subfigure to the bottom subfigure thereof illustrate a process in which the main display unit 20 of the display protrudes from a casing 10.

This vehicle-mounted display comprises the casing 10, which serves as a stationary unit, and also comprises the main display unit 20 and a subcasing 31, which serve as a movable unit, and various kinds of drive mechanisms.

The casing 10 is a box-like enclosure, which is opened on one surface thereof, and fixed to the dashboard D of a vehicle by screws. Further, the display is constructed so that the main display unit 20 projects from the casing 10 through the opening thereof by causing the main display unit 20 and the subcasing 31 to advance toward and retreat from the casing 10.

Usually, almost the entire casing 10 is accommodated and fixed in the dashboard D. Thus, when the entire main display unit 20 is accommodated in the casing 10, the entire main display unit 20 is consequently accommodated in the dashboard D. In such a state, the main display unit 20 is accommodated in the casing 10 so that a principal plane of a screen 21 thereof is nearly parallel to the top and bottom surfaces of the casing 10.

Meanwhile, when the display is utilized, first, the main display unit 20 and the subcasing 31, which serve as the movable unit, start performing horizontal displacement in a direction, in which the main display unit 20 is projected from the casing 10, (that is, in the left direction, as viewed in this figure) as one piece. Moreover, when this movable unit reaches a predetermined place in the casing 10, the main display unit 20 is turned with respect to the subcasing 31. Thus, the main display unit 20 starts performing a stand-up operation. Finally, as shown in the bottom figure of FIG. 5, the main display unit 20 takes such a position that the principal plane of the screen 21 is nearly perpendicular to the top and bottom surfaces of the casing 10. Consequently, a driver can visually check an image displayed on the screen 21.

Incidentally, a drive mechanism for causing the movable unit to perform horizontal displacement so as to advance toward and retreat from the casing 10 and another drive mechanism for causing the main display unit 20 to turn with respect to the subcasing 31 are provided in the subcasing 31. The details of these mechanisms are described in the specification attached to the request in Japanese Patent Application No. 3-355768.

In the case of such a vehicle-mounted display, even during a vehicle runs, the main display unit 20 performs displacement with respect to the casing 10. Thus, there is a fear that abnormal noises are generated owing to phenomena that the running vibrations of a vehicle are transmitted to the vehicle-mounted display, and that thus, the casing 10 and the main display unit 20 of the display hit against each other.

Incidentally, this problem of the generation of abnormal noises can easily be solved by interposing a cushion member between the casing 10 and the main display unit 20 and by then causing the main display unit 20 to slide on this cushion member.

However, when a frame body of the main display unit 20 is thus caused to slide directly on the cushion member, the surface portions of the frame body and the cushion member are cut away by the friction between the frame body and the cushion member. Thus, particulate foreign materials adhere to the cushion member. Further, when the frame body slides again on the cushion member to which such foreign materials adhere, there are fears that the frame body is damaged, and that the adhesion of such foreign materials to the frame body results in a dirty appearance thereof.

SUMMARY OF THE INVENTION

The invention has been made to eliminate the above problems with the related art, and therefore an object of the invention is to provide an electronic equipment having cleaning members each for cleaning foreign materials adhering to a cushion member, thereby preventing from being partly damaged by the foreign materials.

To achieve the above object, according to the invention, there is provided an electronic equipment comprises including cushion members, and cleaning members each for cleaning foreign materials adhering to the cushion member.

DETAILED DESCRIPTION OF THE PREFERRED EMBODIMENTS

Now, a description will be given in more detail of preferred embodiments of the invention with reference to the accompanying drawing.

Figure 1:
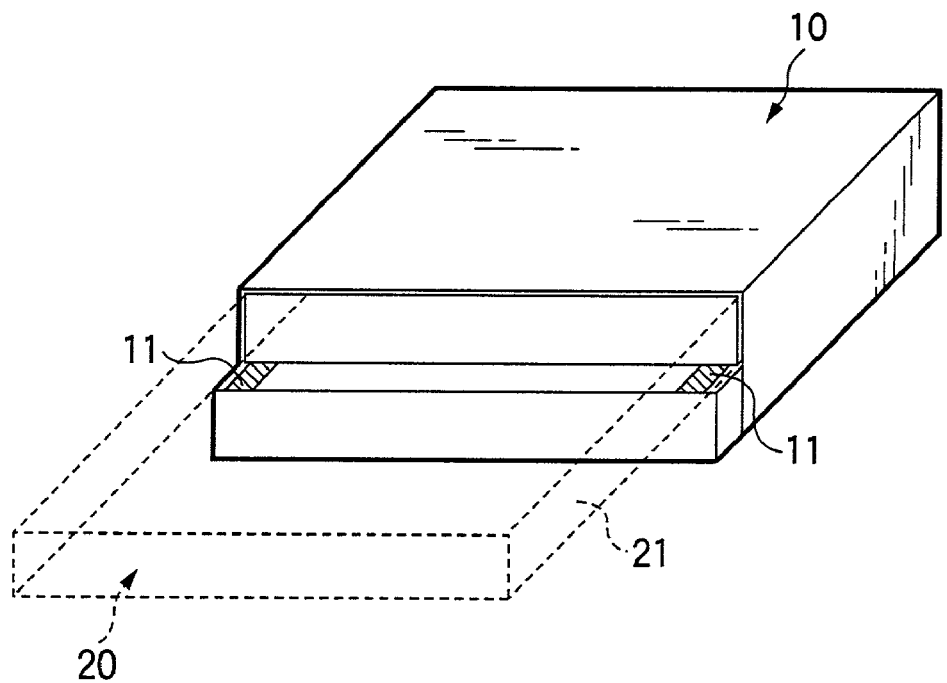
FIG. 1 is a perspective view illustrating the normal state of an on-vehicle display according to a preferred embodiment of the invention.
Figure 2:
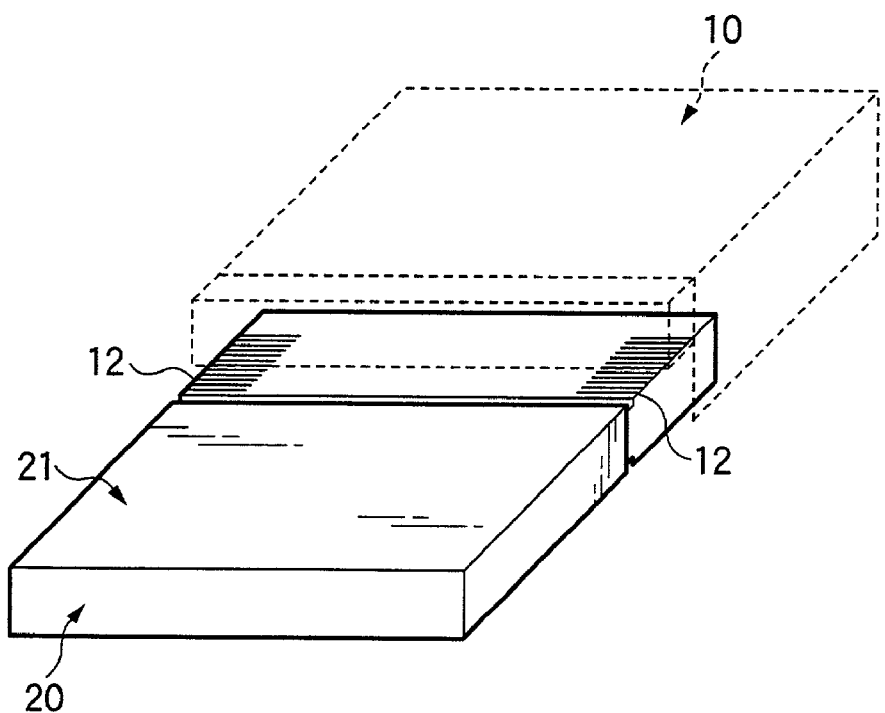
FIG. 2 is a perspective view illustrating the case that the on-vehicle display, which is the preferred embodiment of the invention, is turned over.
Figure 3:
FIG. 3 is a side view illustrating a horizontal displacement process of the on-vehicle display that is the preferred embodiment of the invention.
Figure 3:
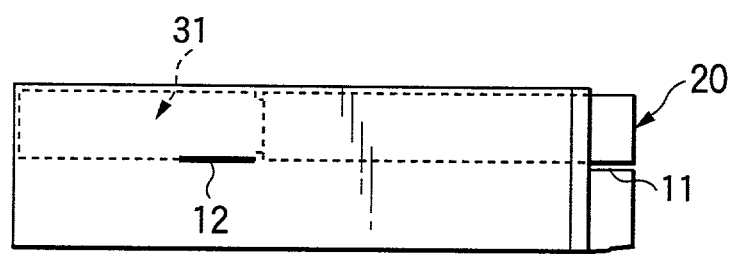
Figure 3:
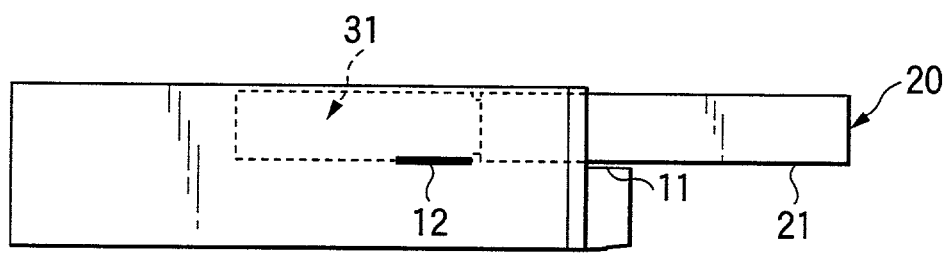
Figure 4:
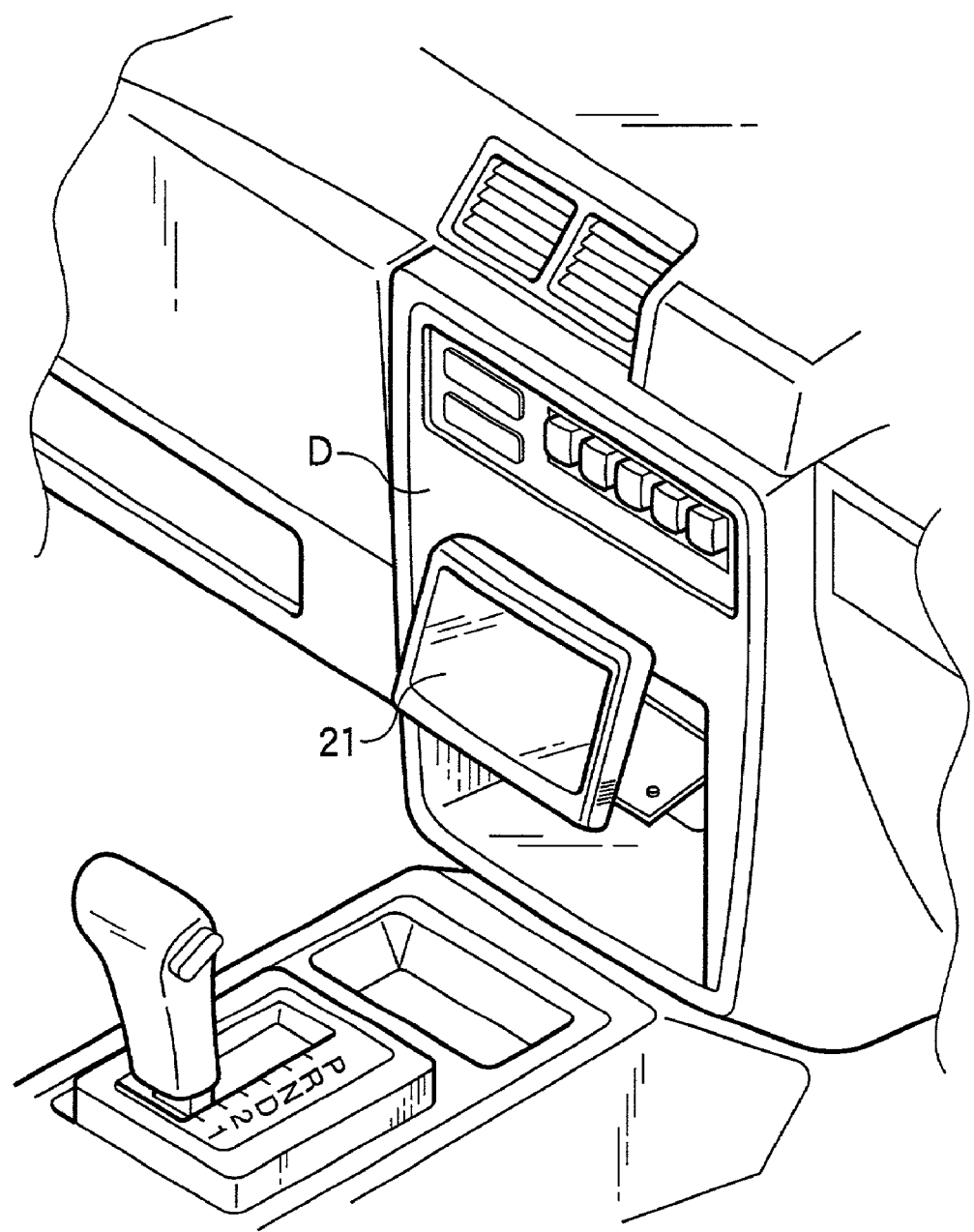
FIG. 4 is a view illustrating a state in which a conventional on-vehicle display is mounted in a vehicle.
Figure 5:
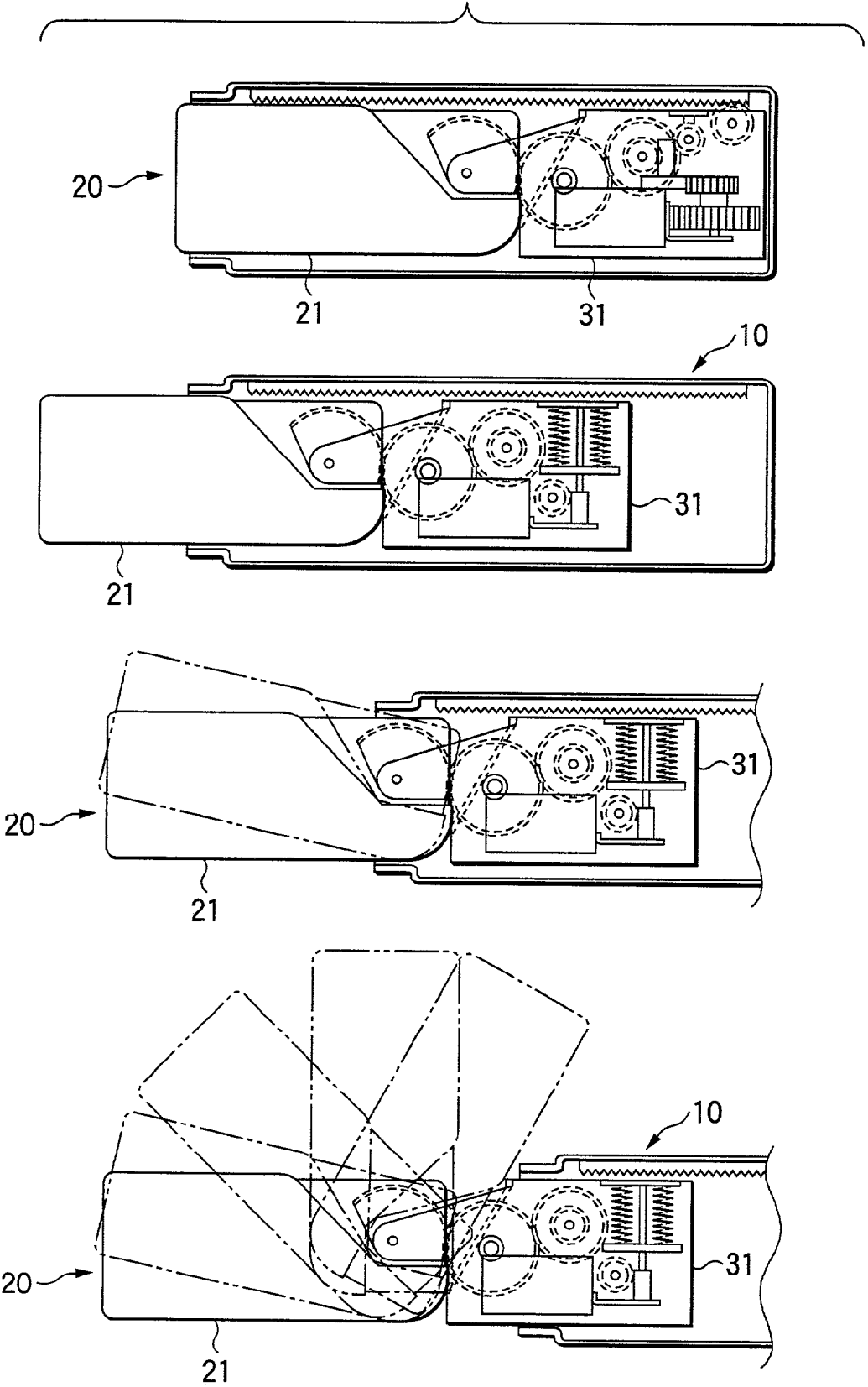
FIG. 5 is a side view illustrating an operation process of the conventional on-vehicle display.

FIGS. 1 to 3 illustrate an example of application of the invention to an on-vehicle display, which has been described in the foregoing description of the related art, as a preferred embodiment of electronic equipment according to the invention.

FIG. 1 is a perspective view illustrating the normal state of the on-vehicle display. A casing 10 serving as a stationary unit is represented by solid lines. A movable unit consisting of a main display unit 20 of the display and a subcasing is represented by dashed lines.

FIG. 2 is a perspective view illustrating a state in which this on-vehicle display is turned over. In this figure, the casing 10 serving as the stationary unit is represented by dashed lines, and the movable unit consisting of the main display unit 20 of the display and the subcasing is represented by solid lines.

Further, FIG. 3 is a left side view showing the on-vehicle display that is in a normal state. The top subfigure to the bottom subfigure of FIG. 3 illustrate, especially a process in which the main display unit 20 of the display moves in a direction that the main display unit 20 protrudes from the casing 10, among processes in which the movable unit performs relative displacement with respect to the stationary unit. Incidentally, when the main display unit 20 of the display is accommodated in the casing 10, the movable unit performs the displacement process from the step shown in the bottom subfigure to the step shown in the top subfigure of FIG. 3.

Additionally, the description of the basic configuration of this embodiment including various kinds of drive systems is omitted herein because the configuration of the on-vehicle display described in the specification and drawings attached to the request in Japanese Patent Application No. 3-355768 is applied thereto.

As illustrated in FIG. 1, cushion members 11 are provided on both sides of the top surface of a front projection portion of the casing 10, respectively. Incidentally, the front projection portion may be formed in such a way as to be integral with the casing 10. Alternatively, the casing 10 may be constructed by forming the box-like portion thereof from a metal chassis, and by resin-molding the front projection portion thereof, and by then integrally fixing these portions. The movable unit is adapted to pass above the top surface of this front projection portion. Consequently, each of the cushion members 11 is interposed between the movable unit and the stationary unit. A member obtained by coating PORON material ("PORON" is a trademark for elastomeric materials manufactured by Rogers Corporation), which provides a shock-absorbing action, with NITOFLON material ("NITOFLON" is a trademark for fluororesin materials manufactured by Nitto Denko Corporation) is utilized as each of the cushion members. NITOFLON material is used for maintaining the good slipperiness of the cushion members when the frame body of the main display unit 20 of the display slides on the cushion members 11. Incidentally, this frame body is formed from a super heat-resistant ABS.

Cleaning members 12 are respectively provided on both sides of the bottom surface of the front portion of the subcasing 31, that is, the connecting portion between the casing 31 and the main display unit 20 of the display. These cleaning members 12 are respectively provided at the places at which the cleaning members 12 can face the cushion members 11 when the movable unit passes above the cushion member 11. Further, reliable cleaning action can be provided by setting the surface area of the cleaning members 12 as being sufficiently larger than that of the cushion members 11. A nonwoven fabric made of HIMELON material ("HIMELON" is a tradename for a nonwoven material developed and put on sale by Ambic Co., Ltd. (formerly, Japan Felt Industrial Co., Ltd.)) is utilized as a material of the cleaning member.

A cleaning action of the on-vehicle display having the cushion members 11 and the cleaning members 12 in this way is described hereinbelow with reference to FIG. 3.

As shown in the top subfigure of FIG. 3, the cushion members 11 respectively abut against the side portions of the frame body of the main display unit 20 that is in an accommodated state. For example, even when the running vibrations of a vehicle are caused in this state, the casing 10 and the main display unit 20 of the display do not hit against each other. Thus, the generation of abnormal noises is prevented.

Next, in the case that this display is put into a utilized state, first, the movable unit starts horizontal displacement, as shown in the middle subfigure of FIG. 3. At that time, the side portions of the frame body of the main display unit 20, which is a part of the movable unit, continuously slides on the cushion member 11. Further, when the horizontal displacement of the movable unit is finished as shown in the bottom subfigure of FIG. 3, each of the cleaning members 12 provided on the subcasing 31, which is a part of the movable unit, reaches a place at which this cleaning members 12 faces a corresponding one of the cushion members 11. Incidentally, even during this horizontal displacement, the side portions of the frame body of the main display unit 20 of the display are in sliding contact with the cushion members 11, respectively. Thus, even when the running vibrations are generated, the casing 10 and the main display unit 20 of the display do not hit against each other. Consequently, the generation of abnormal noises can be prevented. Furthermore, as described above, the cushion members 11 are coated with NITOFLON materials. Thus, the good slipperiness of the cushion members is maintained when the frame body slides on the cushion members 11.

Further, even when the surface portion of the frame body formed from a super heat-resistant ABS is slightly cut away by the contact with the cushion members 11, and the cushion member 11 is shaved, so that shaved particles thereof adhere to the surfaces of the cushion members 11, foreign materials adhering onto the cushion members 11 can be wiped away therefrom by the cleaning members 12, as illustrated in the bottom subfigure of FIG. 3. Thus, when the movable unit moves in such away as to be accommodated in the casing 10, and when the movable unit moves in such a manner as to protrude from the casing 10 again, the foreign materials are removed from the surfaces of the cushion members 11. Consequently, the frame body of the main display unit 20 of the display can reliably be prevented from being damaged by the foreign materials.

Although the cleaning members 12 are provided in the subcasing 31 in the aforementioned embodiment, the position of each of the cleaning members 12 is not limited thereto. Each of the cleaning members 12 may be disposed, for example, at a part of a side portion of the frame body of the main display unit 20 of the display.

That is, the invention can be implemented by providing the cleaning members 12 at places, at which the cleaning members 12 can respectively face the cushion members 11, on a part of the member adapted to pass above the cushion members 11 in the process in which the movable unit moves toward the stationary unit.

Further, although the on-vehicle display, to which the invention is applied, has been described in the foregoing description of the aforementioned embodiment as an example of the electronic equipment to which the invention is applied, such electronic equipment is not limited thereto. The invention may be applied to an operating electronic device for operating the equipment body of electronic equipment by remote control. At that time, the electronic equipment is constructed by employing an operating portion, such as a keyboard, as a movable unit corresponding to a casing serving as a stationary unit.

Furthermore, in the foregoing description of the aforementioned embodiment, the material obtained by cutting a part of the frame body of the main display unit 20 of the display away therefrom has been described as an example of a foreign material. However, foreign materials adhering to the cushion members 11 are not limited thereto. Dust and dirt may be such foreign materials. The invention may be applied to the case that such foreign materials are removed from the display.

As described above, the electronic equipment of the invention is provided with the cleaning member for cleaning foreign materials that adhere to the cushion member. Thus, the electronic equipment is prevented from being partly damaged. Moreover, foreign materials are prevented from adhering to a part of the electronic equipment like dirt.

What is claimed is:

1. A display apparatus comprising:
   a stationary unit;
   a movable unit enabled to perform relative movement with respect to said stationary unit;
   at least one cushion members provided between said stationary unit and said movable unit;
   at least one cleaning member for cleaning a surface of said cushion member; and
   a display unit, the display unit comprising a display and a support member adapted to support the display,
   wherein said support member is arranged to move together with the display and with the movable unit, and
   wherein the cushion member is provided in the vicinity of an opening in the stationary unit, and the cleaning member is provided at a rear end portion of the display unit.

2. The display apparatus according to claim 1, wherein said cushion member is provided on said stationary unit, and wherein said cleaning member is provided on said movable unit.

3. The display apparatus according to claim 1, wherein said cleaning member is provided on a surface of said movable unit, which surface abuts against said cushion member.

4. The display apparatus according to claim 1, wherein a surface area of the cleaning member is larger than the surface area of the cushion member.

5. The display apparatus according to claim 1, wherein the cushion member is arranged to be in constant contact with the movable unit.

6. The display apparatus according to claim 1, wherein the cushion member slidingly and constantly contacts the movable unit.

7. The display apparatus according to claim 1, wherein the cleaning member is arranged to be movable with respect to the cushion member.

8. The display apparatus according to claim 1, wherein the cushion member and the cleaning member are positioned to oppose each other when the movable unit stops moving.

9. The display apparatus according to claim 1, wherein the cushion member and the cleaning member are positioned to oppose each other when the movable unit starts moving.

10. The display apparatus according to claim 1, wherein the cushion member absorbs a vibration of the movable unit.

11. The display apparatus according to claim 1, wherein the cleaning member cleans the surface of the cushion member when the movable unit starts moving.

12. The display apparatus according to claim 1, wherein the cleaning member cleans the surface of the cushion member when the movable unit stops moving.

13. A display apparatus according to claim 1, wherein said movable unit is enabled to perform relative movement with respect to said stationary unit towards said opening.

14. A vehicle-installed display apparatus comprising:
    a stationary unit;
    a movable unit enabled to perform relative movement with respect to said stationary unit;
    at least one cushion member provided between said stationary unit and said movable unit;
    at least one cleaning member for cleaning a surface of said cushion member; and
    a display unit, the display unit comprising a display and a support member adapted to support the display,
    wherein said support member is arranged to move together with the display and with the movable unit, and
    wherein the cushion member is provided in the vicinity of an opening in the stationary unit, and the cleaning member is provided at a rear end portion of the display unit.

15. The vehicle-installed display apparatus according to claim 14, wherein said cushion member is provided on said stationary unit, and wherein said cleaning member is provided on said movable unit.

16. The vehicle-installed display apparatus according to claim 14, wherein said cleaning member is provided on a surface of said movable unit, which surface abuts against said cushion member.

17. The vehicle-installed display apparatus according to claim 14, wherein a surface area of the cleaning member is larger than the surface area of the cushion member.

18. The vehicle-installed display apparatus according to claim 14, wherein the cushion member is arranged to be in constant contact with the movable unit.

19. The vehicle-installed display apparatus according to claim 14, wherein the cushion member slidingly and constantly contacts the movable unit.

20. The vehicle-installed display apparatus according to claim 14, wherein the cleaning member is arranged to be movable with respect to the cushion member.

21. The vehicle-installed display apparatus according to claim 14, wherein the cushion member and the cleaning member are positioned to oppose each other when the movable unit stops moving.

22. The vehicle-installed display apparatus according to claim 14, wherein the cushion member and the cleaning member are positioned to oppose each other when the movable unit starts moving.

23. The vehicle-installed display apparatus according to claim 14, wherein the cushion member absorbs a vibration of the movable unit.

24. The vehicle-installed display apparatus according to claim 14, wherein the cleaning member cleans the surface of the cushion member when the movable unit starts moving.

25. The vehicle-installed display apparatus according to claim 14, wherein the cleaning member cleans the surface of the cushion member when the movable unit stops moving.

26. A display apparatus according to claim 14, wherein said movable unit is enabled to perform relative movement with respect to said stationary unit towards said opening.

* * * * *